United States Patent [19]

Sekiguchi et al.

[11] Patent Number: 5,322,363
[45] Date of Patent: Jun. 21, 1994

[54] HYDRAULIC MODULATOR FOR ANTI-LOCK BRAKE AND TRACTION CONTROL SYSTEM FOR VEHICLE

[75] Inventors: Akihiko Sekiguchi; Yukimasa Mitsude, both of Saitama, Japan

[73] Assignee: Akebono Brake Industry Co., Ltd., Tokyo, Japan

[21] Appl. No.: 907,569

[22] Filed: Jul. 2, 1992

[30] Foreign Application Priority Data

Jul. 5, 1991 [JP] Japan .................. 3-191254

[51] Int. Cl.$^5$ ............................ B60T 8/32
[52] U.S. Cl. ................. 303/113.2; 303/115.4; 303/116.2
[58] Field of Search ........... 303/113.2, 116.1, 116.2, 303/115.4, DIG. 1, DIG. 2, 10, 11

[56] References Cited

U.S. PATENT DOCUMENTS

| | | |
|---|---|---|
| 4,509,802 | 4/1985 | Solleder et al. .................. 303/110 |
| 4,703,979 | 11/1987 | Nakanishi et al. ............... 303/116.1 |
| 4,894,555 | 1/1990 | Watanabe et al. ............... 303/113.2 |
| 5,028,096 | 7/1991 | De La Broise ................. 303/115.4 |
| 5,080,450 | 1/1992 | Kirstein ........................ 303/116.1 |
| 5,165,763 | 11/1992 | Matsuda ..................... 303/DIG. 2 |

FOREIGN PATENT DOCUMENTS

2239913 7/1991 United Kingdom ............ 303/113.2

*Primary Examiner*—Matthew C. Graham
*Attorney, Agent, or Firm*—Finnegan, Henderson Farabow, Garrett & Dunner

[57] ABSTRACT

A hydraulic modulator for an anti-lock brake and traction control system for a vehicle in which a brake liquid pressure, produced in a master cylinder during a normal braking operation, is accumulated in an accumulator via a one-way valve, and a gate valve is provided between the master cylinder and the accumulator so as to prevent brake liquid of an unduly high-pressure from being accumulated in the accumulator, thereby enhancing the durability of the device.

10 Claims, 6 Drawing Sheets

HYDRAULIC MODULATOR FOR ANTI-LOCK BRAKE AND TRACTION CONTROL SYSTEM FOR VEHICLE

BACKGROUND OF THE INVENTION

1. Field of the Invention

This invention relates to a hydraulic modulator for an anti-lock brake and traction control system for a vehicle. More particularly, the invention relates to such a system which is capable of imparting a suitable braking force to wheels at the time of starting the vehicle to prevent drive slippage of the wheels, and which is also capable of controlling the braking force, applied to the wheels, to an optimum level at the time of braking of the vehicle to prevent locking of the wheels.

2. Discussion of the Related Art

Recently, anti-lock brake systems have been developed for avoiding locking of the wheels at the time of braking of the wheels, as well as traction control systems which prevent excessive slippage of drive wheels at the time of abrupt start or acceleration of the vehicle (this is called "traction control") so as to improve driving operation, thereby enhancing the starting and accelerating abilities and driving stability. One known hydraulic modulator for such an anti-lock brake and traction control system for a vehicle is described in U.S. Pat. No. 4,509,802.

The general construction of the hydraulic modulator disclosed in U.S. Pat. No. 4,509,802 will now be described with reference to FIG. 6. As shown in this Figure, two liquid pressure-generating chambers are formed within a cylinder body of a tandem master cylinder 102, and a reservoir 101 is integrated with the body 102. Lines 103 and 104 are connected respectively to the two liquid pressure chambers, and a liquid pressure can be produced in the lines 103 and 104 depressing a brake pedal 100.

Figure 6:
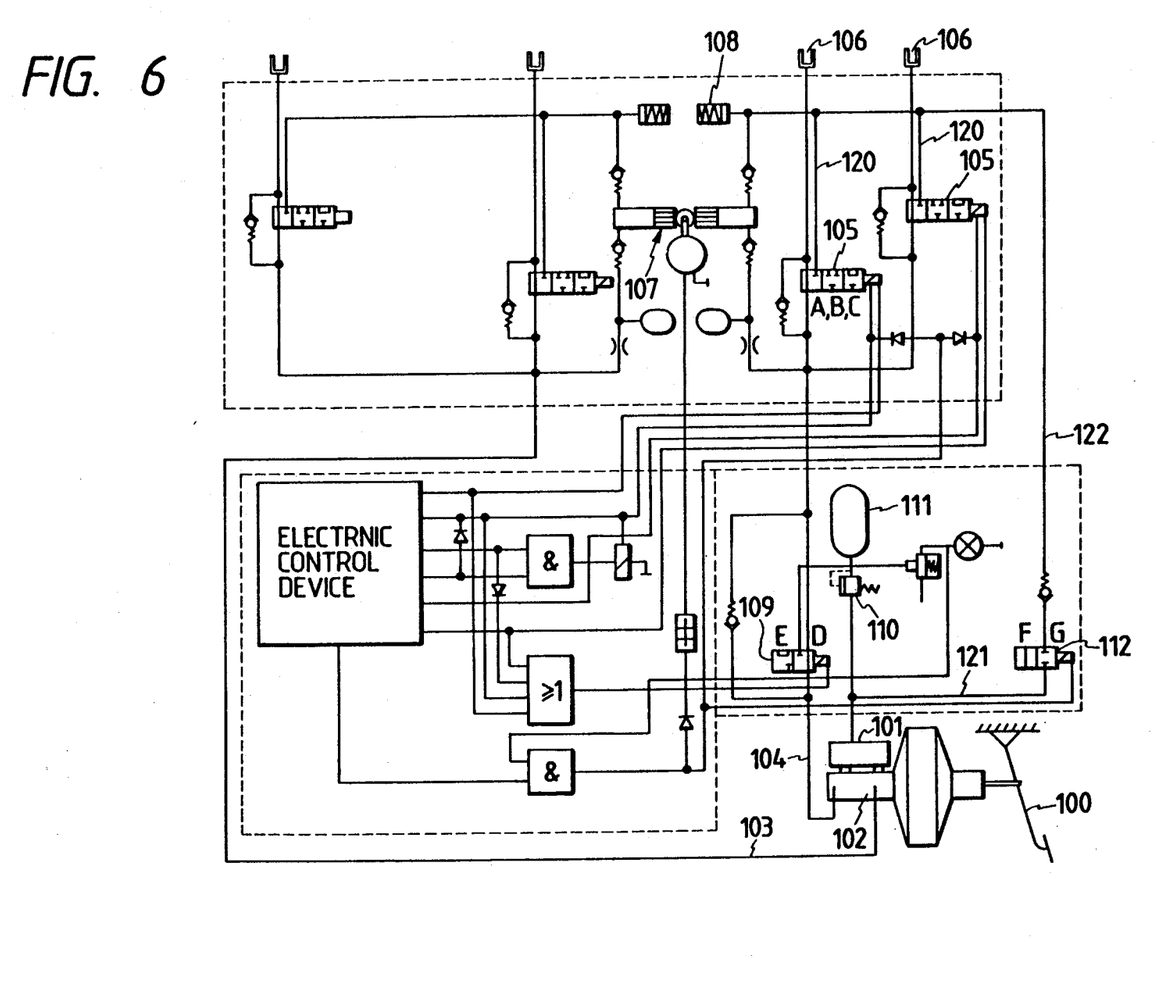
FIG. 6 is a hydraulic circuit diagram of a conventional anti-lock brake and traction control system for a vehicle.

The line 104, connected to one of the liquid pressure chambers, is connected via a cut valve 109 and brake pressure control valves 105 to brake calipers 106 for the drive wheels. As with the drive wheel side, the line 103 is connected via brake pressure control valves to brake calipers of the driven wheels. The cut valve 109 is a two-position (D and E) switch valve, and the brake pressure control valve 105 is a three-port (A, B and C) three-position switch valve.

Lines 120, connected to the brake pressure control valves 105 of the drive wheel side, are connected to a reservoir 108, and the reservoir 108 is connected via a check valve 113 to a suction port of a hydraulic pump 107 driven by a motor. A discharge port of the hydraulic pump 107 is connected to the cut valve 109 via a check valve 113 and a throttle. As shown in the drawings, each check valve 113 comprises a ball and a spring.

The cut valve 109 is connected to a pressure tank 111, and is also connected to a reservoir tank 101 via a relief valve 110. At the time of the traction control, the pressure tank 111 supplies a brake liquid to the brake calipers 106 via the cut valve 109, and has a capacity sufficient to accumulate an amount of brake liquid required for the traction control. With respect to the accumulation in this pressure tank 111, the cut valve 109 is switched to the position E during parking of the vehicle, and when the brake pedal is depressed, the liquid pressure produced in the tandem master cylinder 102 is accumulated in the pressure tank 111 via the check valve 114 and the cut valve 109. Alternatively, during parking of the vehicle, the cut valve 109 and a switch valve 112 are switched to the position E and the position F, respectively, and the hydraulic pump 107 is operated, so that the pressure is accumulated via the reservoir tank 101, the switch valve 112, the hydraulic pump 107 and the cut valve 109, utilizing the discharge pressure of the hydraulic pump 107. The relief valve 110 serves to achieve a constant pressure in the circuit, and also serves as a safety mechanism. For example, in the case where the pressure from the hydraulic pump 107 is to be accumulated in the pressure tank 111, when the pressure discharged from the hydraulic pump 107 becomes unduly high, the brake liquid is transmitted back from the relief valve 110 to the reservoir tank 101 via the cut valve 109 disposed in the E position, thereby preventing damage to the equipment.

The operation of the hydraulic brake device of the above construction is as follows. Referring first to the slip control of the drive wheels, for example, at the time of the start of the vehicle, if the vehicle is started abruptly, so that the drive wheels are subjected to slippage of a level greater than a predetermined value because of an excessive engine torque, an electronic control device detects this condition through a wheel speed sensor. The cut valve 109 is then switched to the position E, and brake liquid of a predetermined pressure is supplied from the pressure tank 111 to the drive wheel brake calipers 106 via the brake pressure control valves 105. As a result, the drive wheels are braked, thereby reducing slippage of the wheels.

During this slip control, the brake control valve 105 can take the positions A, B and C under the control of the electronic control device so as to repeatedly increase, hold and decrease the braking force, thereby controlling the drive slip to the optimum condition. Then, when the drive slip becomes almost zero, the electronic control device detects this, and stops the driving of the hydraulic pump. In this manner, the slip of the wheels at the time of the start of the vehicle is controlled, so that the vehicle can be started smoothly. Thereafter, the brake liquid is again accumulated in the accumulator 111 in the above-mentioned manner.

When the brake pedal 100 is abruptly pressed down during the travel of the vehicle to apply an abrupt braking, the wheels tend to lock. Reference is now made to a brake control for such a condition. When the wheels tend to be locked, the electronic control device judges that the brake pressure should first be maintained at a constant level, and sends a signal to the brake pressure control valve 105 to switch this brake pressure control valve to the position B, thereby holding the wheel braking force at the constant level. When the electronic control device judges that it is not sufficient to merely hold the braking pressure at the constant level, and that the braking pressure should be decreased, the brake pressure control valve 105 is switched to the position C, and the pressure liquid of the brake caliper for each wheel is discharged to the reservoir 108 via the brake pressure control valve 105 and the line 120, so that the braking is reduced. The brake liquid, discharged to the reservoir 108, is immediately drawn into the hydraulic pump 107, and the brake liquid discharged from the hydraulic pump 107 is returned to the lines 103 and 104, and is used to again increase the pressure through the brake pressure control valve 105 disposed in the position A. Otherwise, this brake liquid is returned to the tandem master cylinder 102. Consequently, the tendency for each wheel to be locked is overcome, so that the vehicle can be decelerated or stopped in a stable manner.

In the above hydraulic modulator, however, it is necessary to accumulate liquid pressure in the pressure tank 111 after traction control or when this liquid pressure decreases for some reason. This must be done in preparation for the next traction control. Therefore, in order to accumulate pressure in the pressure tank 111, the accumulation has been done by depressing the brake pedal during the parking of the vehicle, or by suitably switching the cut valve 109 during the operation of the anti-lock brake system so as to utilize the pressure discharged from the hydraulic pump 107. Therefore, the switching control of the cut valve 109, the control of the hydraulic pump 107 and so on must be effected by the electronic control device. This has resulted in a complicated and expensive device. In order to overcome such a drawback, a device has been proposed in which a brake liquid pressure, produced in a master cylinder during a normal braking operation, is accumulated in an accumulator via a one-way valve. In this type of device, however, when the brake pedal is depressed many times, the brake liquid pressure accumulated in the accumulator becomes unduly high. As a result, the high liquid pressure acts on seal portions of a traction control hydraulic circuit for a long period of time, which results in premature deterioration of the seal portion. In this type of device, when the brake liquid is supplied to the accumulator, the pedal stroke becomes greater than usual, which undesirably causes the driver to sense a difference.

SUMMARY OF THE INVENTION

The present invention has been made in view of the above circumstances and as an object seeks to provide a device in which a brake liquid pressure, produced in a master cylinder during a normal braking operation, is accumulated in an accumulator via a one-way valve, and a gate valve is provided between the master cylinder and the accumulator so as to prevent brake liquid of an unduly high-pressure from being accumulated in the accumulator, thereby enhancing the durability of the device. The present invention also seeks to simplify the construction of the device and to achieve a compact and lightweight design of the device.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the present invention provides a hydraulic modulator for an anti-lock brake and traction control system for a vehicle, the modulator comprising master cylinder means for producing a pressurized brake liquid at the time of a braking operation, accumulator means, communicating with the master cylinder means through a fluid line, for accumulating a portion of the pressurized brake liquid produced by the master cylinder means, hydraulic pump means for supplying pressurized brake liquid accumulated in the accumulator to a traction control piston device at the time of traction control, the traction control piston device including means for supplying brake liquid to wheel cylinders of the vehicle during traction control, and gate valve means, connected to the fluid line between the master cylinder means and the accumulator, for interrupting the communication between the master cylinder and the accumulator when the pressure of the pressurized brake liquid accumulated in the accumulator exceeds a predetermined value.

When the liquid pressure within the accumulator in the hydraulic circuit becomes greater than a set spring load provided in the gate valve, a piston in the gate valve moves against the bias of the spring, so that a valve member is abutted against a valve seat to close the passage through which the master cylinder and the accumulator communicate. As a result, the liquid pressure is not supplied from the master cylinder to the accumulator, and therefore brake liquid of an unduly high pressure is prevented from being accumulated in the accumulator. Consequently, this unduly high pressure is prevented from acting on seal members in the traction control hydraulic circuit for a long period of time, thereby preventing the deterioration of the seal members in the traction control hydraulic circuit.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

A hydraulic circuit for right and left drive wheels, a hydraulic circuit for right and left driven wheels, and a hydraulic circuit for a traction control system will be described in sequence. Valves, hydraulic pumps and other elements in these hydraulic circuits are controlled by a known electronic control device (not shown).

Figure 1:
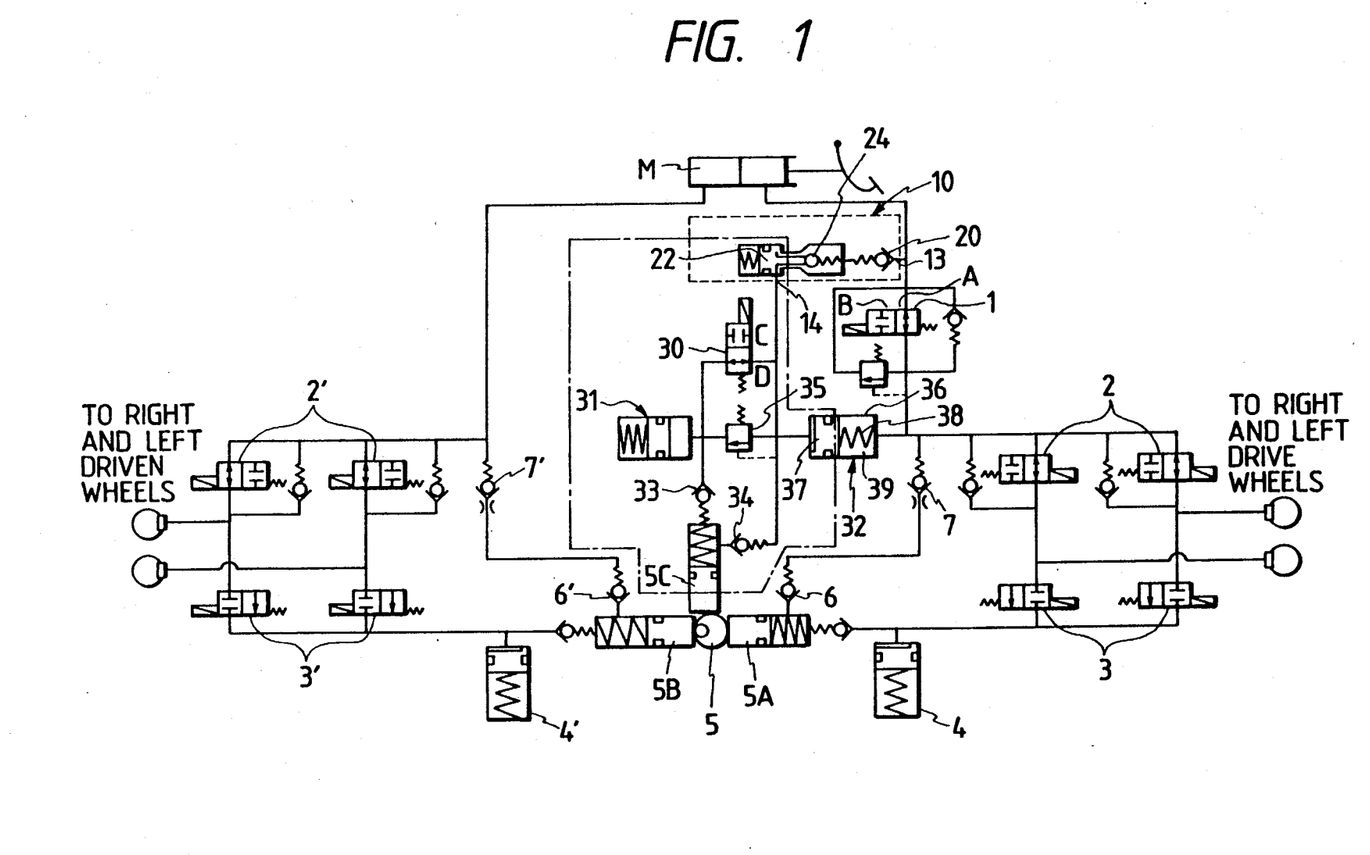
FIG. 1 is a hydraulic circuit diagram of a hydraulic modulator used in an anti-lock brake and traction control system for a vehicle, provided in accordance with a first embodiment of the present invention.

In FIG. 1, reference character M designates a master cylinder, reference numeral 1 a cut valve, reference numeral 2 a hold valve, reference numeral 3 a decay valve, and reference numeral 4 a reservoir. As shown in the drawings, these elements are connected by hydraulic lines between the master cylinder M and the reservoir 4. Wheel cylinders provided at the right and left drive wheels are connected respectively to the lines extending between the respective hold valve 2 and decay valve 3. A suction port of a hydraulic pump 5A is connected to the line extending between the decay valve 3 and the reservoir 4. This hydraulic pump 5A, as well as hydraulic pumps 5B and 5C (later described), is driven by a common eccentric cam 5. A discharge port of the hydraulic pump 5A is connected to the master cylinder M via check valves 6 and 7 and the cut valve 1. The cut valve 1 in the above hydraulic circuit is operated by a signal from an electronic control device (not shown), and is switched to a position B only at the time of the traction control (later described) so as to interrupt the flow passage. The cut valve 1 is switched to a position A a predetermined period of time after the traction control is finished, so as to open the flow passage. The hold valve 2 is operated by a signal from the electronic control device (not shown), and when this valve is operated, fluid communication between the master cylinder M and the wheel cylinder is interrupted. The decay valve 3 is operated by signal from the electronic control device (not shown), and when this valve is operated, the hydraulic passage between the wheel cylinder and the reservoir 4 is opened, so that the brake liquid in the wheel cylinder is discharged to the reservoir 4. The reservoir 4 serves to store the brake liquid discharged from the wheel cylinders. The brake liquid stored in the reservoir 4 is pressurized by the hydraulic pump 5A operated by a signal from the electronic control device, and is transmitted back to the master cylinder M via the check valves 6 and 7 and the cut valve 1. The above hydraulic circuit also serves as a hydraulic circuit for an anti-lock brake system for the drive wheels.

The hydraulic circuit for the driven wheels is similar in construction to that for the drive wheels. In the drawings, reference numeral 2' designates a hold valve, reference numeral 3' a decay valve, and reference numeral 4' a reservoir, and, as shown in the drawings, these components are connected by hydraulic lines between the master cylinder M and the reservoir 4'. Wheel cylinders, provided respectively at the right and left driven wheels, are connected respectively to the lines extending between the respective hold valve 2' and decay valve 3'. A suction port of the hydraulic pump 5B is connected to the line extending between the decay valve 3' and the reservoir 4'. As described above, this hydraulic pump 5B is driven by the eccentric cam 5. A discharge port of the hydraulic pump 5B is connected to the master cylinder M via check valves 6' and 7'. The hold valves 2', decay valves 3' and liquid pump 5B perform the same functions as those in the drive wheel side circuit, and control a lock condition of the driven wheels.

The hydraulic circuit for the traction control system comprises a gate valve 10, a cut valve 30, an accumulator 31, a traction control piston 32, and the hydraulic pump 5C. An inlet of the gate valve 10 is connected via a one-way check valve 20 to the hydraulic line connected between the master cylinder M and the cut valve 1 in the drive wheel side hydraulic circuit. An outlet of this gate valve is connected to the cut valve 30 and the traction control piston 32 and also to the hyiraulic pump 5C via a check valve 34, as shown in the drawings. The gate valve 10 is constructed so as to prevent an excessive liquid pressure from being accumulated in the accumulator 31, as later described. The cut valve 30 is connected to the suction port of the hydraulic pump 5C via the accumulator 31 and a check valve 33. In response to a signal from the electronic control device (not shown), the cut valve 30 is switched to a position C only at the time of the traction control. The accumulator 31 and the traction control piston device 32 are connected together via an unloader valve 35 as shown in the drawings. The traction control piston device 32 is also connected to the inlets of the drive wheel side hold valves 2 as shown in the drawings.

The brake liquid pressure, produced in the master cylinder M at the time of the normal braking operation, is accumulated in the accumulator 31 through the gate valve 10, or the brake liquid is replenished in the accumulator 31 at the time of extraction of the brake air. With this arrangement, at the time of the traction control, the brake liquid can be supplied from the accumulator 31 to the hydraulic pump 5C via the check valve 33. The traction control piston device 32 comprises a piston 37 slidably received in a cylinder 36, and a spring 38 urging this piston 37 to the left in the drawings. The piston 37 is normally urged to the left (in the drawings) by the spring 38, and the drive wheel side brake liquid fills an oil chamber 39 in the cylinder 36. In the traction control piston device 32 at the time of the traction control, the piston 37 is moved to the right (in the drawings) by the brake liquid pressure discharged from the hydraulic pump 5C, so as to supply the brake liquid stored in the oil chamber 39 to the wheel cylinders of the drive wheels via the drive wheel side hold valves 2. In this manner, the braking is applied to the drive wheels subjected to slippage at the time of the start of the vehicle.

Figure 2:
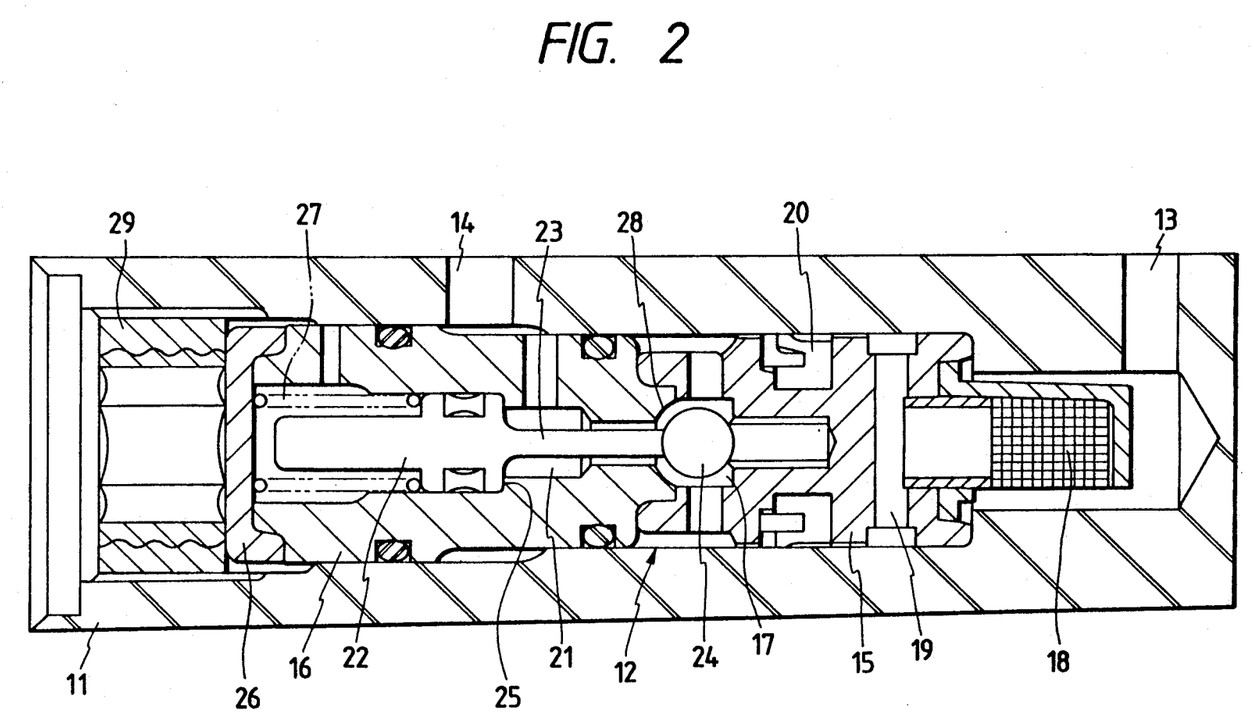
FIG. 2 is a cross-sectional view of a gate valve used in the anti-lock brake and traction control system for a vehicle in the first embodiment of the invention.

The gate valve 10 prevents an unduly high brake liquid pressure from being accumulated in the accumulator 31, and has the following construction. Referring to FIG. 2, a housing 11 has an elongate bore 12 closed at one end. Provided near this closed end of the elongate bore 12 is an inlet port 13 which communicates with the master cylinder M. Provided near the open end of the elongate bore 12 is an outlet port 14 which communicates with the accumulator 31. Two passage-forming members 15 and 16 are provided in the elongate bore 12, and are arranged in this order from the closed end of the bore. A space 17 for receiving a ball valve 24 (later described) is formed at the point of connection between the passage-forming members 15 and 16. The passage-forming member 15 has a passage 19 communicating with the inlet port 13 formed in the housing 11, and a filter 18 is provided between this passage 19 and the inlet port 13.

The passage 19 and the above space 17 communicate with each other via the one-way check valve 20 and also via a passage provided at the outer periphery of the passage-forming member 15. The passage-forming member 16 has a passage 21 through which the above space 17 and the outlet port 14 formed in the housing 11 communicate. A valve seat 28 is provided at one end of the passage 21 opening to the space 17, and when the ball valve 24 provided within the space 17 abuts against the valve seat 28 of the passage 21, the passage 21 is closed. The ball valve 24 is connected to a piston 22 through a rod 23 extending through the passage 21, and the piston 22, having a step 25, is slidably received in a bore which communicates with the passage 21.

The piston 22 is normally held in a position to open the ball valve 24, as shown in the drawings, such that the piston 22 is urged against the step 25 of the passage-forming member 16 by a spring 27 acting between a spring seat 26, fixedly secured to the end of the passage-forming member 16, and the piston 22. The spring load of spring 27 is set such that when the brake liquid pressure within the accumulator 31 becomes higher than a predetermined value, the liquid pressure moves the piston to the left in the drawings.

Therefore, when the liquid pressure within the accumulator 31 becomes greater than the set spring load, this liquid pressure acts on the piston 22, so that the piston 22 is moved to the left (in the drawings) against the bias of the spring 27. As a result, the ball valve 24 abuts against the valve seat 28 to close the passage 21, so that the liquid pressure from the master cylinder M ceases to be supplied to the accumulator 31. Thus, the gate valve 10 can prevent the unduly high brake liquid pressure from being accumulated in the accumulator 31, and can prevent the unduly high pressure from acting on the traction control hydraulic circuit. As a result, deterioration of seal members in the traction control hydraulic circuit can be prevented. The passage-forming members 15 and 16 of the above construction are fixedly retained within the housing 11 by a plug 29.

Next, the operation of the hydraulic modulator for the anti-lock brake and traction control system for the vehicle will be described. First, the control of the anti-lock brake system will be described. When the brake pedal is depressed in order to brake the vehicle, hydraulic pressure is produced in the master cylinder M. This hydraulic pressure is supplied via the hold valves 2' to the wheel cylinders for the driven wheels, and is supplied via the cut valve 1 and the hold valves 2 to the wheel cylinders for the drive wheels, thereby applying a braking force to the wheels. The condition of each wheel during the braking operation is detected by a wheel speed sensor (not shown), and is inputted to the known electronic control device. In accordance with these inputs, the electronic control device calculates a wheel speed, a slip rate, a deceleration and so on. When it is judged from these calculation results that the wheel is in a locked condition, the electronic control device controls the hold valves 2, 2', the decay valves 3, 3' and the hydraulic pumps 5A, 5C.

When a brake hold signal is outputted from a control circuit, the hold valves 2, 2' are closed to block the hydraulic lines extending between the master cylinder M and the wheel cylinders, thereby maintaining the brake liquid pressure of the wheel cylinders. When a braking-decreasing signal is outputted from the electronic control device (not shown), the hold valves 2, 2' are closed to block the hydraulic lines extending between the master cylinder M and the wheel cylinders, and at the same time the decay valves 3, 3' are opened to connect the wheel cylinders with the respective reservoirs 4 and 4', so that the brake liquid in the wheel cylinders is discharged to the reservoirs 4 and 4', thereby decreasing the braking force. The brake liquid discharged to the reservoirs 4 and 4' is transmitted by the hydraulic pumps 5A and 5B (which are operated simultaneously when the liquid pressure control is started) back to the master cylinder M via the check valves 6, 6' and 7 and 7'. At this time, although the hydraulic pump 5C is also driven simultaneously, the brake liquid discharged from the hydraulic pump 5C is again drawn back into the hydraulic pump 5C via the cut valve 30 and the check valve 33. It is to be noted that the liquid pressure controls for the wheel cylinders are operated independently of one another in accordance with the conditions of the wheels.

The operation of the traction control of the hydraulic brake control device will now be described. At the time of starting the vehicle, if the vehicle is started abruptly, so that the drive wheels are subjected to a slippage of a level greater than a predetermined value because of an excessive engine torque, the wheel speed sensor detects this condition, and a signal from this sensor is inputted to the known electronic control device.

When the signal for controlling the drive slip is outputted from the electronic control device, the cut valve 1 and the cut valve 30 are energized to take the positions B and C, respectively. At the same time, the hydraulic pump 5C begins to be driven, and the brake liquid is fed thereto from the accumulator 31 via the check valve 33. As described above, brake liquid of a predetermined pressure has been accumulated in the accumulator 31 via the gate valve 10. The brake liquid fed to the hydraulic pump 5C from the accumulator 31 is supplied to the traction control piston device 32 via the check valve 34. The liquid pressure at this time causes the piston 37 in the traction control piston device 32 to move to the left (in the drawings) against the bias of the spring 38, so that the brake liquid in the oil chamber 39 is supplied to the wheel cylinders via the hold valves 2. Thus, the drive wheel subjected to slippage is braked, thereby reducing the slippage. During this slip control, the hold valve 2 and the decay valve 3 are switched by the electronic control device in accordance with the slip condition of each drive wheel so as to repeatedly hold, decrease and increase the braking force, thereby controlling the drive slip to the optimum condition. When the drive slippage ceases, it is detected by the electronic control device, and the driving of the hydraulic pump 5C is stopped, and also the cut valves 1 and 30 are switched to the position A and D. When the liquid pressure from the hydraulic pump 5C is higher than the set pressure of the unloader valve 35, the brake liquid is fed back to the accumulator 31. In the manner described above, the slippage of the wheels at the time of starting the vehicle is controlled, so that the vehicle can start smoothly.

Figure 3:
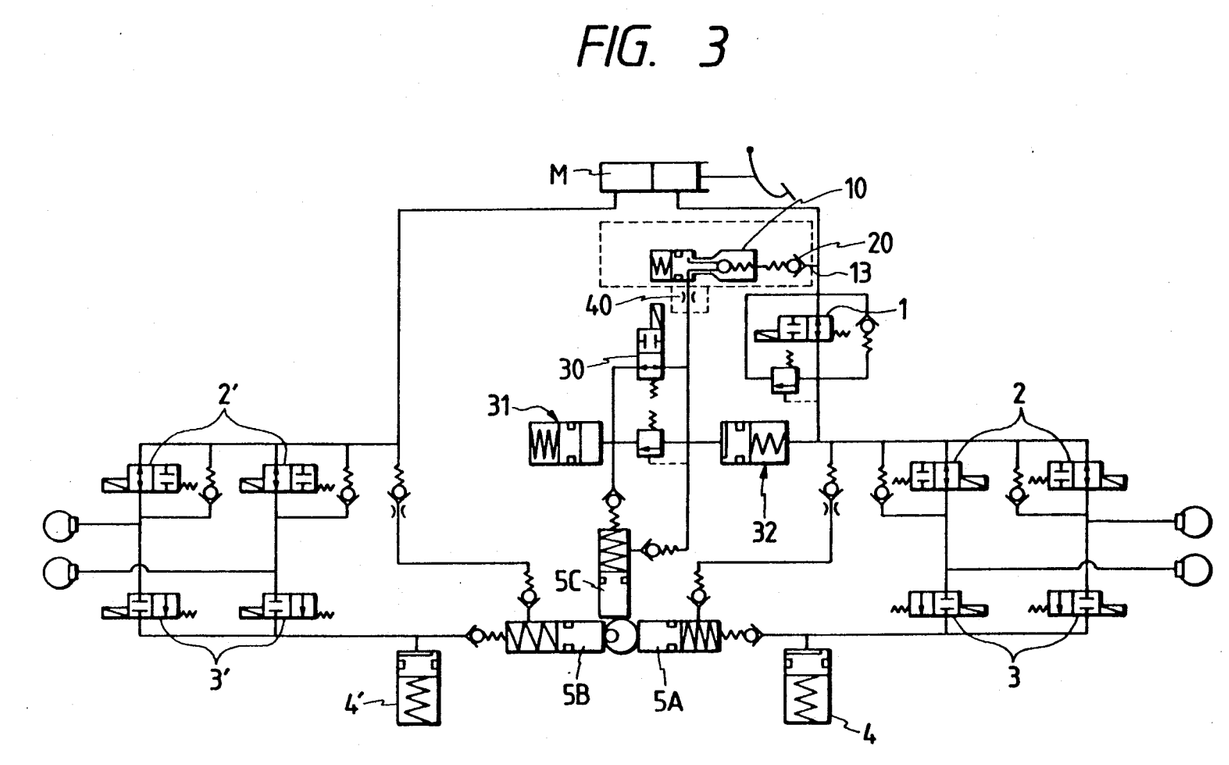
FIG. 3 is a hydraulic circuit diagram of a hydraulic modulator used in an anti-lock brake and traction control system for a vehicle, provided in accordance with a second embodiment of the present invention.

Next, a second embodiment of a gate valve 10 will be described with reference to FIG. 3. In the first embodiment of the gate valve 10 described above, when the brake liquid in the accumulator 31 in the traction control hydraulic circuit decreases for some reason, the brake liquid can be replenished in the accumulator 31 from the master cylinder M via the gate valve 10 (the one-way check valve 20 reduced in outer diameter by the liquid pressure, the ball valve 24) and the cut valve 30 by depressing the brake pedal. In this case, the pedal stroke may become larger than usual. Therefore, in this second embodiment, a throttle 40 is provided at an outlet of the gate valve 10, as shown in FIG. 3, so as to prevent the pedal stroke from being abruptly changed when the brake liquid is replenished to the accumulator, thereby ensuring that the driver cannot sense a difference. Therefore, the second embodiment of FIG. 3 differs from the first embodiment only in that the throttle 40 is provided at the outlet of the gate valve 10.

Figure 4:
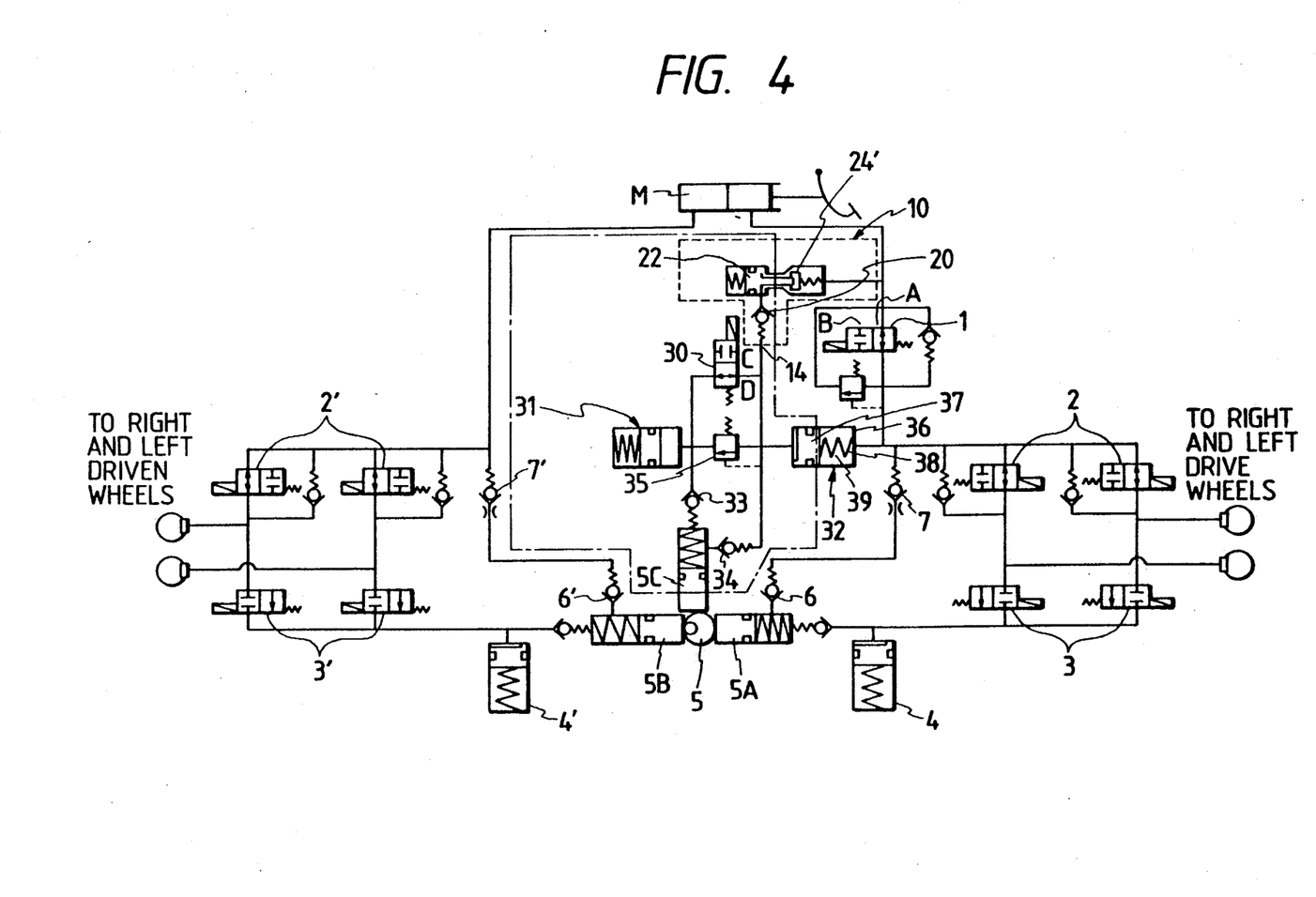
FIG. 4 is a hydraulic circuit diagram of a hydraulic modulator used in an anti-lock brake and traction control system for a vehicle, provided in accordance with a third embodiment of the present invention.
Figure 5:
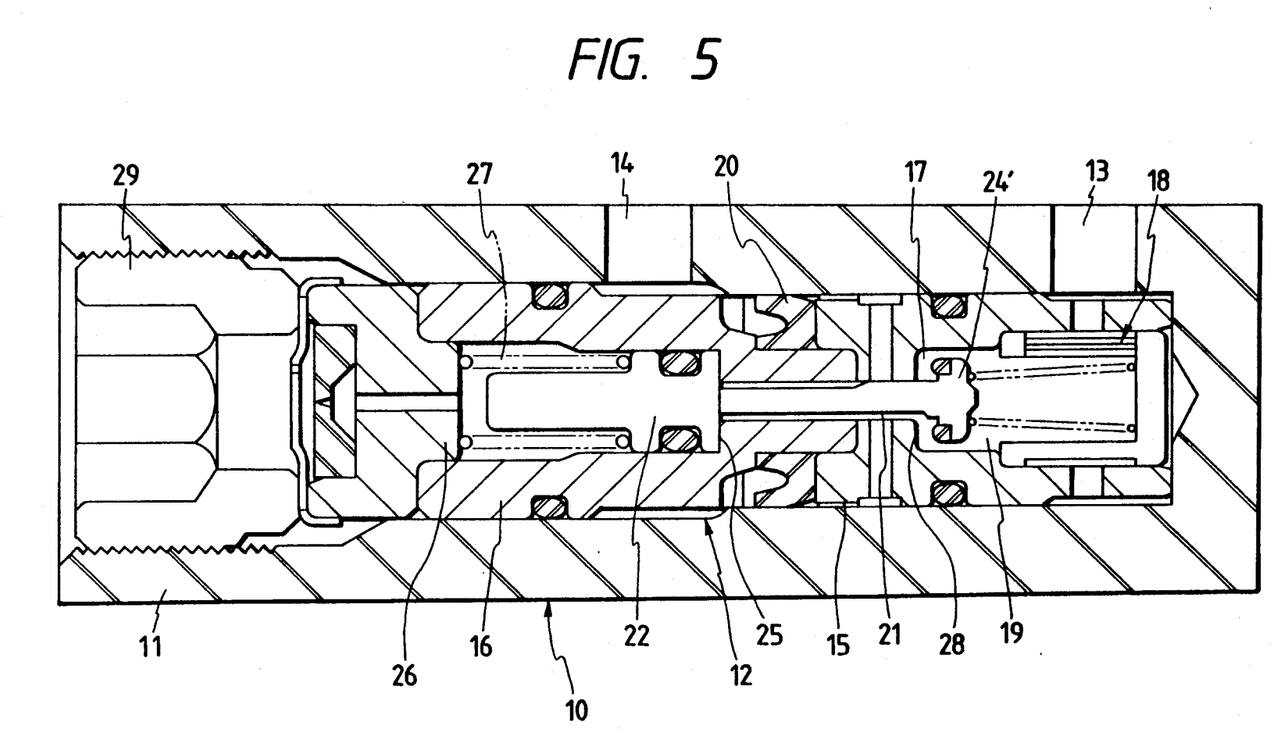
FIG. 5 is a cross-sectional view of a gate valve used in the anti-lock brake and traction control system for a vehicle in the third embodiment of the invention.

A third embodiment of a gate valve will now be described with reference to FIGS. 4 and 5. In the first and second embodiments of the gate valves 10, the one-way check valve 20 is provided at the passage extending between the ball valve 24 and the inlet port 13. However, in this third embodiment, a one-way check valve 20 is provided at a passage extending between a disk-type valve 24' (corresponding to the ball valve 24 in the first and second embodiments) and an outlet port 14.

With this arrangement, the discharge pressure of the pump 5C will not act on the disk-type valve 24' at the time of the drive slip braking. The remaining construction and operation of the second and third embodiments are similar to those of the first embodiment, and therefore explanation thereof is omitted.

As described above in detail, in the present invention, the gate valve is provided between the master cylinder and the accumulator in the traction control hydraulic circuit, and this gate valve functions to prevent the unduly high brake liquid, fed from the master cylinder, from being accumulated in the accumulator. Therefore, the high liquid pressure is prevented from acting on the seal portion of the traction control hydraulic circuit for a long period of time. As a result, the durability of the seal portion is enhanced, and the device can be simplified in construction, and can be lightweight and compact. Further, by providing the throttle at the outlet of the gate valve, it is possible to prevent an abrupt change of the pedal stroke when the brake liquid is replenished in the accumulator. Consequently, the driver will not sense a difference at the time of the braking operation.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by tho claims appended hereto, and their equivalents.

What is claimed is:

1. A hydraulic modulator for an anti-lock brake and traction control system for a vehicle comprising;
    master cylinder means for producing a pressurized brake liquid at the time of a braking operation;
    accumulator means, communicating with said master cylinder means through a fluid line, for accumulating a portion of said pressurized brake liquid produced by said master cylinder means;
    hydraulic pump means for supplying pressurized brake liquid accumulated in said accumulator means to a traction control piston device at the time of traction control, said traction control piston device including means for supplying brake liquid to wheel cylinders of said vehicle during traction control; and
    gate valve means, connected to said fluid line between said master cylinder means and said accumulator means, for interrupting the communication between said master cylinder means and said accumulator means when the pressure of said pressurized brake liquid accumulated in said accumulator means exceeds a predetermined value,
    wherein said gate valve means includes;
    an elongated bore connected to said fluid line through which said accumulator means and said master cylinder means communicate, said elongated bore having an inlet port communicating with said master cylinder means and an outlet port communicating with said accumulator means,
    a valve seat formed within said elongated bore,
    a piston slidably disposed within said elongated bore, said piston having a first end,
    a valve member connected to said first end of said piston, said valve member interrupting the communication between said master cylinder means and said accumulator means when in abutment with said valve seat, and
    spring means, connected to said piston, for normally biasing said piston such that said valve member is not in abutment with said valve seat, said spring means having a spring constant selected according to said predetermined value such that said piston and said valve member are moved against the bias of said spring means by said pressurized brake liquid when the pressure of the pressurized brake liquid in said accumulator means exceeds said predetermined value, said valve member being placed in abutment with said valve seat.

2. A hydraulic modulator for an anti-lock brake and traction control system for a vehicle according to claim 1, wherein said gate valve means includes a one-way check valve disposed within said elongated bore between said inlet port and said valve member.

3. A hydraulic modulator for an anti-lock brake and traction control system for a vehicle according to claim 1, wherein said gate valve means includes a one-way check valve disposed within said elongated bore between said outlet port and said valve member.

4. A hydraulic modulator for an anti-lock brake and traction control system for a vehicle according to claim 1, wherein said valve member is a ball valve.

5. A hydraulic modulator for an anti-lock brake and traction control system for a vehicle according to claim 1, wherein said valve member is a disk-type valve.

6. A hydraulic modulator for an anti-lock brake and traction control system for a vehicle, comprising;
    master cylinder means for producing a pressurized brake liquid at the time of a braking operation;
    accumulator means, communicating with said master cylinder means through a fluid line, for accumulating a portion of said pressurized brake liquid produced by said master cylinder means; and
    gate valve means, connected to said fluid line between said master cylinder means and said accumulator means, for interrupting the communication between said master cylinder means and said accumulator means when the pressure of said pressurized brake liquid accumulated in said accumulator means exceeds a predetermined value,
    wherein said gate valve means includes:
    an elongated bore, connected to said fluid line, through which said accumulator means and said master cylinder means communicate, said elongated bore having an inlet port communicating with said master cylinder means and an outlet port communicating with said accumulator means,
    a valve seat formed within said elongated bore,
    a piston slidably disposed within said elongated bore, said piston having a first end,
    a valve member connected to said first end of said piston, said valve member interrupting the communication between said master cylinder means and said accumulator means when in abutment with said valve seat, and
    spring means, connected to said piston, for normally biasing said piston such that said valve member is not in abutment with said valve seat, said spring means having a spring constant selected according to said predetermined value such that said piston and said valve member are moved against the bias of said spring means by said pressurized brake liquid when the pressure of the pressurized brake liquid in said accumulator means exceeds said predetermined value, said valve member being placed in abutment with said valve seat.

7. A hydraulic modulator for an anti-lock brake and traction control system for a vehicle according to claim 6, wherein said gate valve means includes a one-way check valve disposed within said elongated bore between said inlet port and said valve member.

8. A hydraulic modulator for an anti-lock brake and traction control system for a vehicle according to claim 6, wherein said gate valve means includes a one-way check valve disposed within said elongated bore between said outlet port and said valve member.

9. A hydraulic modulator for an anti-lock brake and traction control system for a vehicle according to claim 6, wherein said valve member is a ball valve.

10. A hydraulic modulator for an anti-lock brake and traction control system for a vehicle according to claim 6, wherein said gate valve member is a disk-type valve.

* * * * *

UNITED STATES PATENT AND TRADEMARK OFFICE
CERTIFICATE OF CORRECTION

PATENT NO. : 5,322,363
DATED : June 21, 1994
INVENTOR(S) : Akihiko Sekiguchi et al.

It is certified that error appears in the above-indentified patent and that said Letters Patent is hereby corrected as shown below:

On the title page, under "Attorney, Agent, or Firm" line 1, after "Henderson" insert --,--.

Signed and Sealed this

Eleventh Day of April, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,322,363
DATED : June 21, 1994
INVENTOR(S) : Akihiko Sekiguchi et al.

It is certified that error appears in the above-indentified patent and that said Letters Patent is hereby corrected as shown below:

Claim 10, column 12, Line 11, before "valve" delete --gate--.

Signed and Sealed this

Fifteenth Day of August, 1995

Attest:

BRUCE LEHMAN

*Attesting Officer*     *Commissioner of Patents and Trademarks*